UNITED STATES PATENT OFFICE.

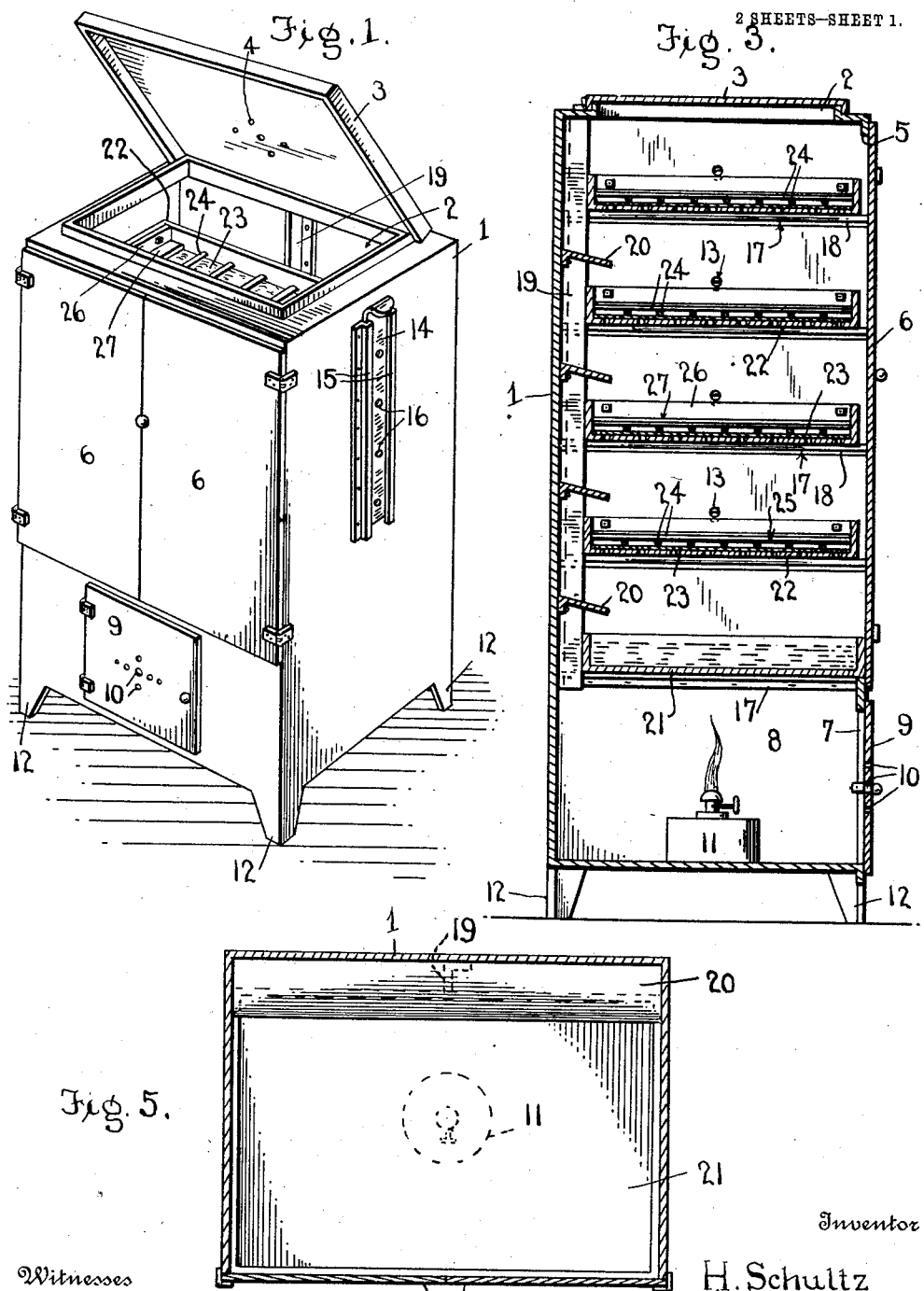

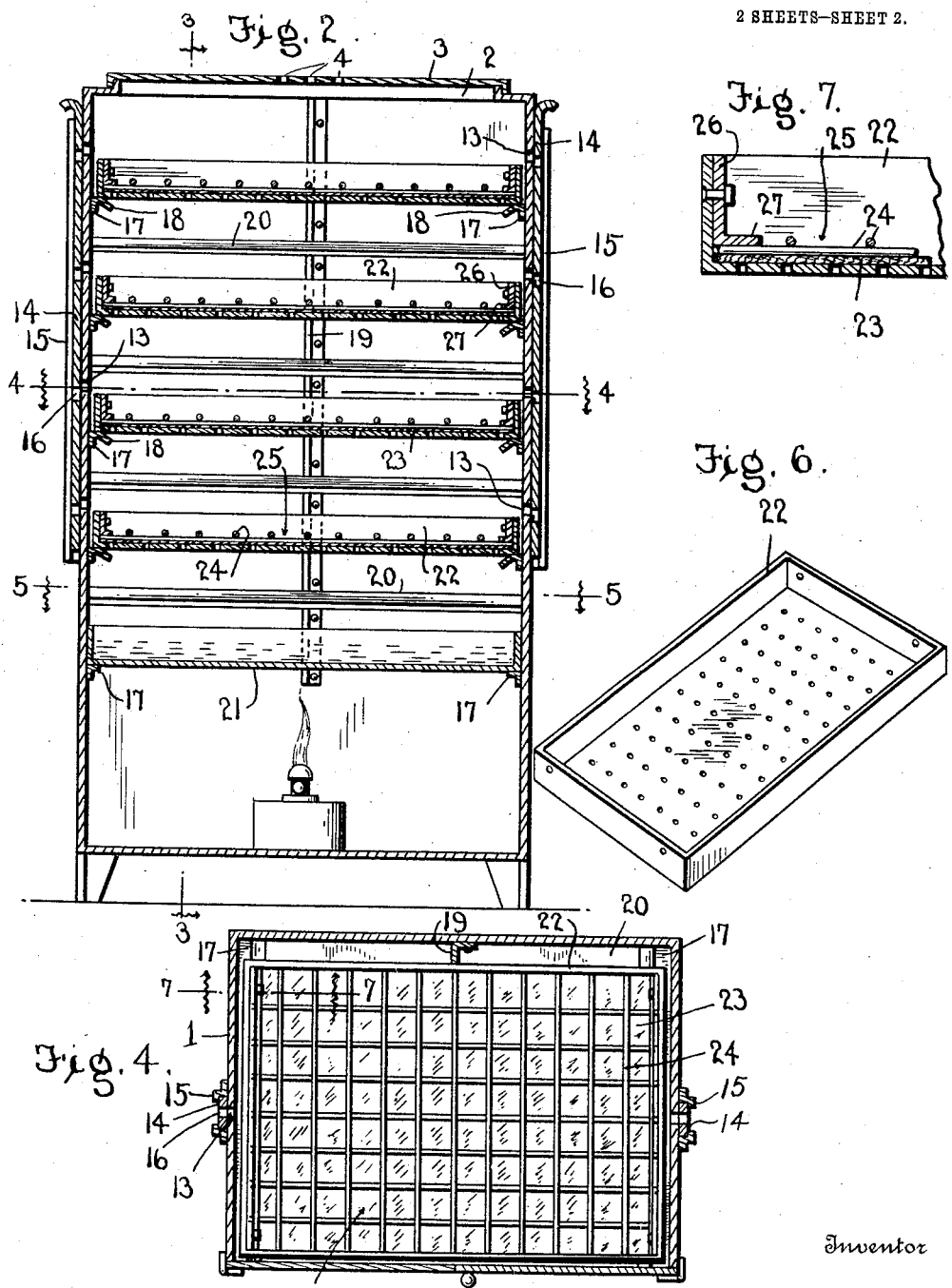

HERMAN SCHULTZ, OF PARKERSBURG, IOWA.

SEED-SPROUTER.

1,063,742. Specification of Letters Patent. Patented June 3, 1913.

Application filed September 23, 1912. Serial No. 721,911.

*To all whom it may concern:*

Be it known that I, HERMAN SCHULTZ, a citizen of the United States, residing at Parkersburg, in the county of Butler and State of Iowa, have invented certain new and useful Improvements in Seed-Sprouters; and I do declare the following to be a full, clear, and exact description of the invention, such as will enable others skilled in the art to which it appertains to make and use the same.

This invention relates to improvements in seed sprouters or germinators.

One object of the invention is to provide a device of this character which is particularly adapted for testing the fertility of corn and other seeds and for sprouting oats or other grain to produce green food for feeding poultry in winter.

Another object is to provide a seed sprouter or germinator of the character described having an improved construction and arrangement of trays for supporting the seed while being sprouted and which will be simple and inexpensive in construction, efficient and reliable in operation and well adapted to the purpose for which it is designed.

With these and other objects in view, the invention consists of certain novel features of construction, combination and arrangement of parts as will be more fully described and claimed.

In the accompanying drawings; Figure 1 is a perspective view of my improved seed sprouter; Fig. 2 is a vertical cross sectional view of the same; Fig. 3 is a vertical sectional view taken on the line 3—3 of Fig. 2; Fig. 4 is a horizontal sectional view taken on the line 4—4 of Fig. 2 showing a plan view of one of the seed sprouting trays arranged for germinating or testing seed; Fig. 5 is a similar view taken on the line 5—5 of Fig. 2 showing a plan view of the tray for holding water from which the moisture is generated for sprouting the seed in the trays above; Fig. 6 is a detail perspective view of one of the trays as arranged for sprouting seed to produce green food for poultry; Fig. 7 is an enlarged detail vertical sectional view taken on the line 7—7 of Fig. 4 showing the manner in which the trays are constructed and arranged for testing seed.

In the embodiment of the invention I provide a casing 1 which may be of any suitable size and shape and which is preferably constructed of galvanized sheet metal. The casing 1 is provided on its upper end with a flanged opening 2 having a hinged cover 3 in which are formed ventilating openings 4. In the front side of the upper portion of the casing is an opening 5 through which the trays of the device are placed in and removed from the casing and which is adapted to be closed by hinged doors 6. In the lower portion of the front side of the casing is also arranged an opening 7 through which access may be had to the lamp compartment 8 in the lower end of the casing. The opening 7 is closed by a hinged door 9 having therein ventilating openings 10 through which air is supplied to the lamp 11 in the compartment 8.

The casing 1 is preferably provided with short supporting feet 12 and in the sides of the upper portion of the casing are formed series of ventilating openings 13 over which on the outer surface of the sides of the casing are slidably mounted damper plates 14. The plates 14 are slidably supported by frictional engagement with parallel vertical guide strips 15 and in the plates 14 are openings 16 which are adapted to be brought more or less into register with the openings 13 in the sides of the casing to regulate the size of said openings and thereby control the ventilation of the casing.

Arranged at suitable positions on the inner surface of the sides of the casing are series of tray supporting cleats 17 which are preferably in the form of angle iron strips the outer edges of the horizontal members of which are inclined downwardly as shown at 18 to permit the water of condensation caught by the cleats to readily drip therefrom into the trays below. Secured to the inner surface of the rear wall of the casing is an angle iron stop strip 19 which limits the inward movement of the trays and spaces the same a suitable distance from the rear wall of the receptacle. Also secured to the inner surface of the rear wall of the casing are a series of horizontal or transversely disposed inclined baffle plates 20 one of which is preferably disposed above each of the trays except the top tray. The plates 20 are provided to deflect the vapor which passes upwardly through the casing away from the rear side of the casing and into the spaces between the trays or, in other words, the plates 20 prevent a direct upward draft and passage of the vapor through the spaces between the rear sides of the trays and the rear wall of the casing. The plates 20 are inclined downwardly toward their front edges to cause any water of condensation caught thereby to drip or run freely off the same and into the trays below.

Removably supported on the lower cleats 17 of the casing immediately above the lamp is a water tray 21 while with the cleats 17 above the water tray are removably engaged sprouting trays 22. The trays 22 are provided with perforated bottoms and are of sufficient depth to receive the desired quantity of grain or seeds placed therein for germination or sprouting. When the device is employed for sprouting oats or other grain or seed to produce green food for the purpose of feeding poultry in winter the seed or grain is placed directly onto the perforated bottoms of the trays and the latter placed in position on the cleats above the water tray in the casing.

When the device is to be employed for germinating or testing corn or other grain or seeds a pad 23 of suitable absorbent material is preferably placed on the perforated bottoms of the trays and over said absorbent pad is placed a coarse mesh screen 24 which divides the tray into a plurality of compartments or spaces 25 which may be provided with designating letters or numerals and which are adapted to receive one or more seeds which are placed on the pad within the spaces of the screen. The pads 23 and the screen coverings 24 are removably held in position in the trays by clamping plates 26 which are bolted or otherwise secured to the inner sides of the ends of the trays and have on their lower edges right angular flanges 27 which bear against the screens 24 and clamp the latter and the pads into tight engagement with the bottoms of the trays. By thus arranging the screens, it will be seen that various kinds or grades of seed may be placed in the trays for testing, said seeds being kept separate for identification in the spaces formed by the screens 24. It will be understood that the pads 23 and screens 24 are arranged in the trays only when the latter are to be employed for germinating seeds for testing the fertility and vitality of the same and that when the trays are employed for sprouting grain to produce green food the pads and screens are removed therefrom.

In using the device for testing seed each of the trays is provided with a piece of cloth which is placed over the seeds or grain therein, after which water is poured into the upper tray through the opening in the top of the casing and overflows from said upper tray onto the trays below and flows into the water tray 21 in the lower portion of the casing. After the water has been applied to the trays in the manner described the cloth coverings are removed. This wetting of the contents of the trays may be repeated every twenty-four hours or as often as is necessary and between the times in which the contents of the trays are thus moistened the vapor generated from the water in the lower tank 21 by the heat of the lamp 11 passes upwardly through the openings in the bottoms of the trays and around the sides and between the latter thus producing the proper temperature and moisture for quickly germinating and sprouting the fertile seeds placed in the trays of the casing. When the contents of the trays have been thus germinated or sprouted to the desired extent the trays are removed through the opening 5 in the front of the casing and the contents of the trays taken out and replaced by other seed or other trays containing fresh seed are substituted for the trays removed from the casing. The vapor in arising from the water tray 21 passes between the ends and rear edges of the trays and is deflected inwardly over the trays and thus moistens the contents thereof which, together with the moisture coming up through the perforated bottoms of the trays and through the absorbent pads contained thereon, causes the seeds to quickly germinate. The temperature and amount of moisture supplied to the device between the trays is controlled or regulated by the ventilating openings 13 and 16 formed in the ends of the casing and the damper plates 14 as hereinbefore described. Any excess of vapor or moisture accumulating in the device is discharged through the ventilating openings 4 in the cover or top 3 of the casing.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined and claimed.

Having thus described my invention, what I claim is:

1. A seed sprouter comprising a casing having therein top and side openings and ventilating openings, a ventilated cover to close said top opening, doors to close said side opening, one of said doors having ventilating openings, a heating compartment in the lower portion of said casing, a heat supplying medium arranged in said compartment, damper plates arranged over the ventilating openings in the casing, whereby the size of the said openings is regulated, series of tray supporting cleats arranged in the casing, seed supporting trays engaged with said cleats, a spacing strip arranged between the rear wall of the casing and the trays, and vapor deflecting plates arranged between the trays.

2. A seed sprouter comprising a casing, a series of tray supporting cleats arranged therein and having their outer edges inclined downwardly, downwardly inclined vapor deflecting plates secured to the rear wall of the casing between said tray supporting cleats, a water tray arranged on the lower cleats of the casing, seed supporting trays on the cleats in the upper portion of the casing above said water tray, said seed supporting trays having perforated bottoms, absorbent pads adapted to be placed in the trays over the perforated bottoms thereof, space forming screens arranged over said pads, and clamps detachably secured to the ends of the trays to removably secure said screens and pads therein.

3. In a seed sprouter, a seed sprouting tray having a perforated bottom, an absorbent pad engaged with said bottom, a spacing screen arranged over said pad, and clamping plates secured to the ends of the tray to engage said screen and thereby hold the same and said pad in position in the tray.

In testimony whereof I have hereunto set my hand in presence of two subscribing witnesses.

HERMAN SCHULTZ.

Witnesses:
FANNIE R. TAMMEN,
AUGUST LEHR.

Copies of this patent may be obtained for five cents each, by addressing the "Commissioner of Patents, Washington, D. C."